(12) United States Patent
Khoryaev et al.

(10) Patent No.: US 12,082,137 B2
(45) Date of Patent: Sep. 3, 2024

(54) DATA-AIDED SIDELINK SYNCHRONIZATION FOR NR V2X COMMUNICATION

(71) Applicant: Apple Inc., Cupertino, CA (US)

(72) Inventors: Alexey Khoryaev, Nizhny Novgorod (RU); Mikhail Shilov, Nizhny Novgorod (RU); Sergey Panteleev, Nizhny Novgorod (RU); Andrey Chervyakov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/286,718

(22) PCT Filed: Oct. 31, 2019

(86) PCT No.: PCT/US2019/059136
§ 371 (c)(1),
(2) Date: Apr. 19, 2021

(87) PCT Pub. No.: WO2020/092751
PCT Pub. Date: May 7, 2020

(65) Prior Publication Data

US 2021/0377893 A1    Dec. 2, 2021

Related U.S. Application Data

(60) Provisional application No. 62/754,529, filed on Nov. 1, 2018.

(51) Int. Cl.
*H04W 56/00* (2009.01)
*H04L 5/00* (2006.01)
*H04W 4/40* (2018.01)

(52) U.S. Cl.
CPC ....... *H04W 56/0015* (2013.01); *H04L 5/0048* (2013.01); *H04W 4/40* (2018.02)

(58) Field of Classification Search
CPC ..... H04W 56/0015; H04W 4/40; H04W 4/14; H04W 4/44; H04W 4/46; H04W 56/002; H04L 5/0048; H04L 5/0051; H04L 5/0053
See application file for complete search history.

(56) References Cited

U.S. PATENT DOCUMENTS

2018/0092085 A1* 3/2018 Shaheen ............... H04W 36/14
2018/0212733 A1 7/2018 Khoryaev et al.
(Continued)

FOREIGN PATENT DOCUMENTS

WO    2016108456 A1    7/2016

OTHER PUBLICATIONS

International Preliminary Report on Patentability dated Apr. 27, 2021 in connection with PCT Application No. PCT/US2019/059136.

(Continued)

*Primary Examiner* — Dady Chery
(74) *Attorney, Agent, or Firm* — Eschweiler & Potashnik, LLC (57) ABSTRACT

A user equipment (UE), gNodeB or network component can be configured to support a data-aided sidelink synchronization. In response to losing a sidelink synchronization reference, sidelink synchronization tracking or performing an initial sidelink synchronization, data-aided sidelink synchronization can be performed by deriving or maintaining a sidelink synchronization from a physical sidelink control channel (PSCCH), or a physical sidelink shared channel (PSSCH) transmission of another network device, UE or vehicle to everything (V2X) based on data of another reference signal that is with the PSCCH or the PSSCH transmission.

18 Claims, 4 Drawing Sheets

(56) References Cited

U.S. PATENT DOCUMENTS

2018/0242317 A1    8/2018  Marinier et al.
2019/0037622 A1*   1/2019  Blasco Serrano .... H04W 72/23
2020/0053683 A1*   2/2020  Gulati ................... G01S 19/04

OTHER PUBLICATIONS

PCT Search Report dated Feb. 21, 2020 in connection with PCT Application No. PCT/US2019/059136.
PCT Written Opinion dated Feb. 21, 2020 in connection with PCT Application No. PCT/US2019/059136.
Huawei et al., Sidelink Synchronization enhancement in V2V communication, R1-164105, 3GPP TSG RAN WG1 Meeting #85, Nanjing, China, May 14, 2016 pp. 1-5; and figure 1.
Intel Corp., Sidelink Synchronization for NR V2X Communication, R1-1810774, 3GPP TSG RAN WG1 Meeting #94bis, Chengdu, China, Sep. 29, 2018 pp. 2-10; and figure 4.
Huawei et al., Sidelink synchronization mechanisms for NR V2X, R1-1808094, 3GPP TSG RAN WG1 Meeting #94, Gothenburg, Sweden, Aug. 10, 2018 p. 2.
Chinese Office Action dated Feb. 7, 2024 in connection with Application Serial No. 201980065839.4.

* cited by examiner

DATA-AIDED SIDELINK SYNCHRONIZATION FOR NR V2X COMMUNICATION

REFERENCE TO RELATED APPLICATIONS

This application is a National Phase entry application of International Patent Application No. PCT/US2019/059136 filed Oct. 31, 2019, which claims the benefit of U.S. Provisional Application No. 62/754,529 filed Nov. 1, 2018, entitled "METHOD OF DATA-AIDED SIDELINK SYNCHRONIZATION FOR NR V2X COMMUNICATION", the contents of which are herein incorporated by reference in their entirety.

FIELD

The present disclosure relates to wireless technology, and more specifically to techniques for data-aided sidelink synchronization for new radio (NR) vehicular communication.

BACKGROUND

Mobile communication, including cellular communication, involves the transfer of data between mobile devices. A type of mobile communication includes vehicle communication, where vehicles communicate or exchange vehicle related information. The vehicle communication can include vehicle to everything (V2X), which includes vehicle to vehicle (V2V), vehicle to infrastructure (V2I) and vehicle to pedestrian (V2P).

In some situations, vehicle related information is intended for a single vehicle or other entity. In other situations, such as emergency alerts, vehicle related information is intended for a large number of vehicles or other device entities. The emergency alerts can include collision warnings, control loss warnings, and the like.

As of today, the sidelink synchronization is enabled in LTE V2X technology where multiple reference sources can be used for sidelink synchronization Global Navigation Satellite System (GNSS), eNodeB (eNB), sidelink synchronization signal (SLSS) (UE deriving timing from either GNSS, eNB or other user equipments (UEs) that derive timing from GNSS, or eNB). However, various enhancements to this procedure aim to reduce initial synchronization time.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry or device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
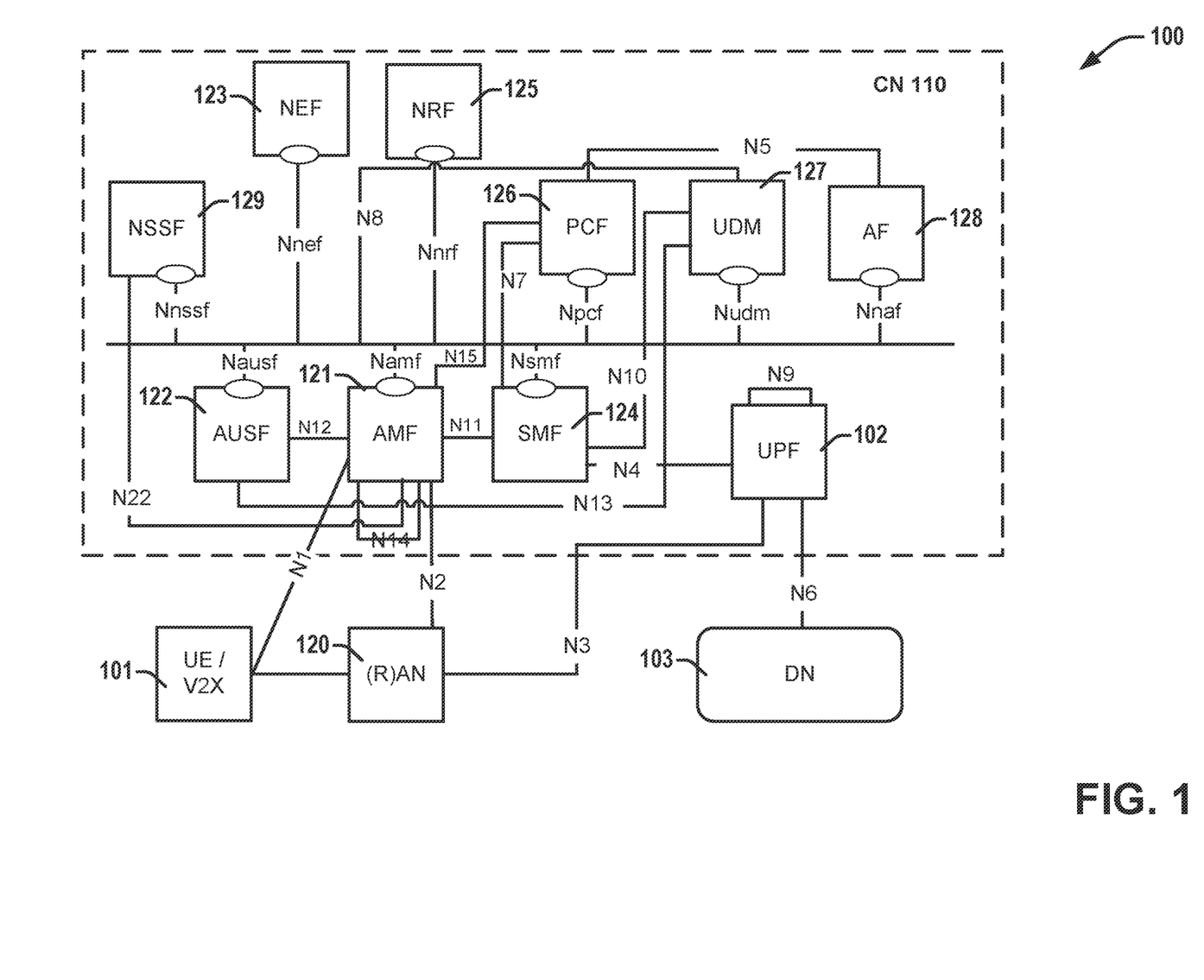
FIG. 1 is a block diagram illustrating an example user equipments (UEs) in a network with network components useable in connection with various aspects described herein.

FIG. 1 illustrates architecture of a system 100 including a core network (CN) 110 in accordance with various embodiments. The system 100 is shown to include a user equipment (UE)/vehicle to everything (V2X) device 101, a radio access network (R)AN 120 or access node (AN), a 5GC 110, and a data network (DN) 103, which can be, for example, operator services, Internet access or 3rd party services.

The UE (as a V2X) 101 can comprise one or more of: vehicles (V2V), vehicles and infrastructure (V2I), vehicles and pedestrians (V2P), or other network device(s)/component(s). In various embodiments, one or more of UE configurations, UE provided information, network provided information, and coverage for the UE can be used to select a V2X RAT for transmission (e.g., DSRC, LTE, 5G, or other RAT). As there are multiple technologies available for V2X communications, some vehicles (via the UE 101) can be equipped with these multiple access technologies for V2X communication and utilize sidelink communication according to these technologies.

The 5GC 110 can include an Authentication Server Function (AUSF) 112, an Access and Mobility Function (AMF) 121, a Session Management Function (SMF) 124, a Network Exposure Function (NEF) 123, a Policy Control Function (PCF) 126, a Network Function Repository Function (NRF) 125, a Unified Data Management (UDM) 127, an application function (AF) 128, a user plane function (UPF) 102, and a Network Slice Selection Function (NSSF) 129. Each of these components can be used for processing corresponding 5GC network functions (NFs) or performance measurements related thereto as network functions associated with any one or more of the embodiments herein.

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform Quality of Service (QoS) handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 120 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 120 and the AMF 121 for the control plane, and can be a termination point for the N3 reference point between the (R)AN 120 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G—Equipment Identity Register (EIR).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 110, and comprises both the signaling connection between the UE and the Access Network (AN) (e.g., Radio Resource Control (RRC) connection or UE-N3IWF connection for non-3GPP access) and the N2 connection for the UE 101 between the AN (e.g., RAN or memory 230) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 110 request, and released upon UE 101 and 5GC 110 request using NAS SM signaling exchanged over the N1 reference point between the UE 101 and the SMF 124. Upon request from an application server, the 5GC 110 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NS-SAIs), if needed. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Figure 2:
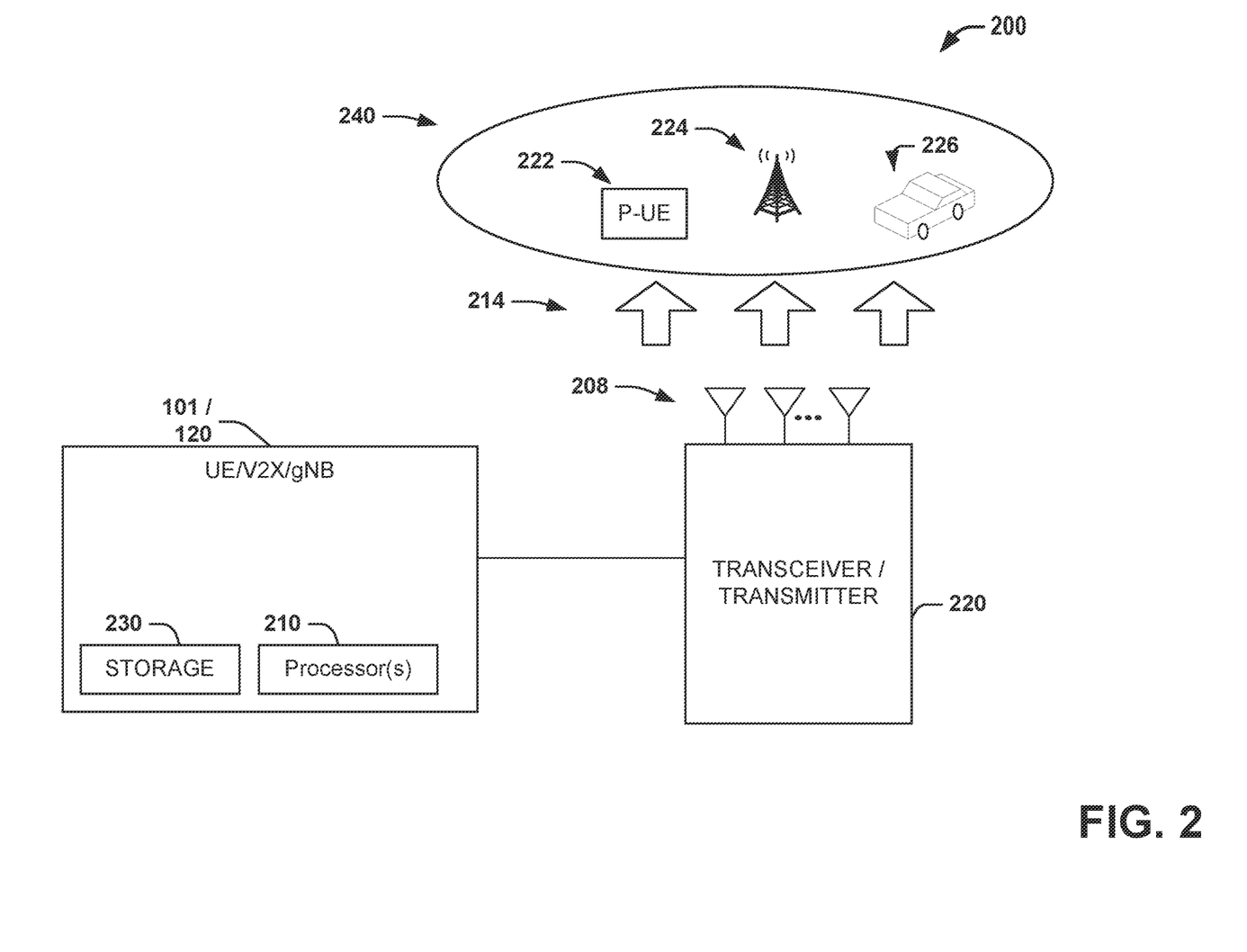
FIG. 2 is a diagram illustrating example components of a network device that can be employed in accordance with various aspects discussed herein.

Referring to FIG. 2, illustrated is a block diagram of a system 200 employable at a UE (User Equipment)/V2X 101, or RAN 120 as a next generation Node B (gNodeB or gNB) or other BS (base station)/TRP (Transmit/Receive Point), or a component of a 3GPP (Third Generation Partnership Project) network (e.g., a 5GC (Fifth Generation Core Network)) component such as in embodiments herein. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains). This transmitter circuitry and receiver circuitry of transceiver 220 can employ common or distinct circuit elements, or a combination thereof). The memory 230 can comprise any of a variety of storage mediums and can store instructions or data associated with one or more of processor(s) 210 or the communication circuitry 220. Specific types of embodiments (e.g., UE embodiments) can be indicated via subscripts (e.g., system 200 comprising processor(s) 210 (e.g., of a UE), communication circuitry 220, and memory 230). In BS embodiments (e.g., system 200 of a gNB) and network component (e.g., UPF (User Plane Function), etc.) embodiments (e.g., system 200 of a UPF) processor(s) 210 of the gNB (etc.), communication circuitry 220 (etc.), and memory 230 (etc.) can be in a single device or can be included in different devices, such as part of a distributed architecture. In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

The UE 101 can receive V2X configuration information when the UE is authorized to use V2X services over the 3GPP network. This authorization is done by a V2X function in the core network, and part of the authorization procedure the V2X function can send a list of preferred air interface technologies. Alternatively, V2X configuration can be performed by an application server that is not part of the core network. The UE 101 can employ one or more channel quality measurements such as power measurements or other measurements related to sidelink communication.

V2X UEs can be in a given coverage area inside a cell covered by an gNB that supports 5G, LTE and DSRC road side unit (RSU) functionality. These UEs can notify the gNB/RSU which V2X communication RAT(s) is/are supported. Based on that information, the network can choose an access technology for the UEs to use. The system 200 includes vehicle/traffic participant entities 240. The vehicle/traffic participant entities 240 include one or more pedestrians devices (P-UEs) 222, infrastructure entities 224 (e.g., RAN 120), vehicle entities 226, or other network device(s)/component(s). The V2X UE 101 can also include one or more antenna 208 for communications, which includes sidelink communications 214 with the vehicle/traffic participant entities 240.

The vehicle communications between the V2X UE 101 and any vehicle/pedestrian device entities 240 can utilize co-operative awareness that includes information from other vehicles, sensors and the like, to process and share the information to provide vehicle services such as collision warning, autonomous driving, and the like. The V2X UE 101 is configured to obtain, select or determine QoS attributes associated with sidelink communications. Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, or the like. For example, the frame structure has parameters including sampling rate, frame length, subframe length, subcarrier spacing and cyclic prefix length and are based on the obtained success ratio.

The sensing operations can be a simplified sensing procedure for V2X UE resource selection aiming to reduce complexity and power consumption. In general, the principles of sensing and resource selection procedure can be used for sidelink communication management. The resource (re)selection triggering utilized herein can include a resource reselection counter, a probabilistic reselection based on a probability to reselect one or more resources, and one or more reselection triggering conditions including whether the UE 101, for example, skips transmission on a preconfigured/predetermined number of resource reservation cycles. In particular, modifications could be considered in a resource exclusion operation and sidelink (SL) received signal strength indication (SL-RSSI) averaging of non-excluded resources, or other sidelink channel indication. Such indication, can provide whether the sidelink signal or sidelink synchronization reference has been lost or not available for initial sidelink synchronization, for example.

Embodiments herein include various mechanisms including enhanced NR sidelink synchronization operation comprising a data-aided sidelink synchronization process. Data-aided sidelink synchronization can be used/triggered if the UE 101 or 240 has lost/dropped/not acquired a sidelink synchronization reference such as from another network device as a Global Navigation Satellite System (GNSS), eNB, gNB, or a sidelink synchronization signal (SLSS) of a UE. Data-aided sidelink synchronization can be applied by the UE 101 or 240 for initial sidelink synchronization. The UE 101 or 240 can derive or maintain sidelink synchronization from UE PSCCH/PSSCH transmissions by using associated/corresponding demodulation reference signal (DMRS) signals or transmission of other reference signals that can include an automatic gain control (AGC) training signal, sidelink sounding reference signal (SRS), sidelink channel state information reference signals (CSI-RS) or any other reference signal accompanied with PSCCH/PSSCH transmission. Alternatively, or additionally, information about sidelink synchronization resources carrying SLSS/physical sidelink broadcast channel (PSBCH) transmission can be (pre-)configured to one or more UEs 101, 240.

In an embodiment, each network device or sidelink transmitter can implement data-aided synchronization by communication a type or source of a current sidelink synchronization reference or the original sidelink synchronization source being used for sidelink communication. In this manner, another network device, or UE, for example, can derive a sidelink synchronization from the PSCCH or the PSSCH transmission. In other aspects, the source can be used to determine which network device sidelink communication or data sidelink communication could be more reliable, and then use the data from this device for maintaining or deriving sidelink synchronization, at initialization or in response to the sidelink synchronization reference being lost/dropped/unavailable or to keep track/monitor sidelink synchronization.

An original sidelink synchronization reference comprises GNSS, eNB/gNB or ISS sidelink synchronization reference may comprises a network device comprising a GNSS device, an eNB/gNB device, a UE directly synchronized to eNB/gNB ($UE_{eNB}/UE_{gNB}$), UE indirectly synchronized to eNB/gNB and propagating synchronization from network ($UE_{UE-eNB}/UE_{UE-gNB}$), a UE directly synchronized to GNSS ($UE_{GNSS}$), UE in-directly synchronized to GNSS and propagating sync from GNSS ($UE_{UE-GNSS}$), LTE UE serving as independent synchronization source ($UE_{LTE-ISS}$), NR UE serving as independent synchronization source ($UE_{NR-ISS}$), UE (in)-directly synchronized to $UE_{LTE/NR-ISS}$ and propagating its timing ($UE_{UE\_LTE/NR-ISS}$), or other network component.

In an embodiment, information about the source/type of current sidelink synchronization reference or original sidelink synchronization source can be conveyed via PSCCH or PSSCH as a separate field of SCI format or MAC/RRC signaling respectively or implicitly encoded into a cyclic redundancy check (CRC), scrambling or reference signal structure, so that other UEs can detect it and select another UE to be used for sidelink synchronization. The information about a sidelink system frame or slot number can be also conveyed through PSCCH/PSSCH in either SCI Format or MAC CE Header or RRC in order to provide full sidelink timing information. Information on sidelink system frame or slot number could be also implicitly encoded during PSCCH/PSSCH transmission as a part of CRC, scrambling or other means. The UE/V2X device 101 can process, receive, provide, or otherwise convey this data to enable a lost/unavailable/dropped sidelink synchronization reference to be established/derive for sidelink communication (e.g., a vehicle or UE sidelink communication). For example, the UE 101 that successfully received PSCCH/PSSCH transmission can be allowed to extract sidelink synchronization information for sidelink communication.

In an embodiment, the UE 101 can perform data-aided sidelink synchronization for initial sidelink synchronization. This can be performed based on an AGC training/synchronization signal that can be used to extract synchronization parameters for sidelink communication and transmitted at the beginning of a slot transmission. The data-aided sidelink synchronization can be applied by the UE 101 for initial sidelink synchronization comprising a procedure that enables use of the predefined sidelink synchronization sources and selection of the first detected synchronization reference to initiate sidelink communication while continuing a search for the highest priority synchronization reference and seamless reselection of synchronization references when higher priority sync references are detected.

The information related to sidelink synchronization resources that carry SLSS/PSBCH can be (pre)-configured to UE. The information can be a sidelink synchronization source priority, and can also comprise at least one of: a subcarrier spacing (SCS) for a SLSS and a physical sidelink broadcast channel (PSBCH) transmission, a cyclic prefix (CP) length, a bandwidth (BW) location, a center frequency for the SLSS/the PSBCH transmission, a type of original or reference synchronization source, a period of the SLSS/the PSBCH transmission, or an offset with respect to a sidelink system frame number or a slot number.

Figure 3:
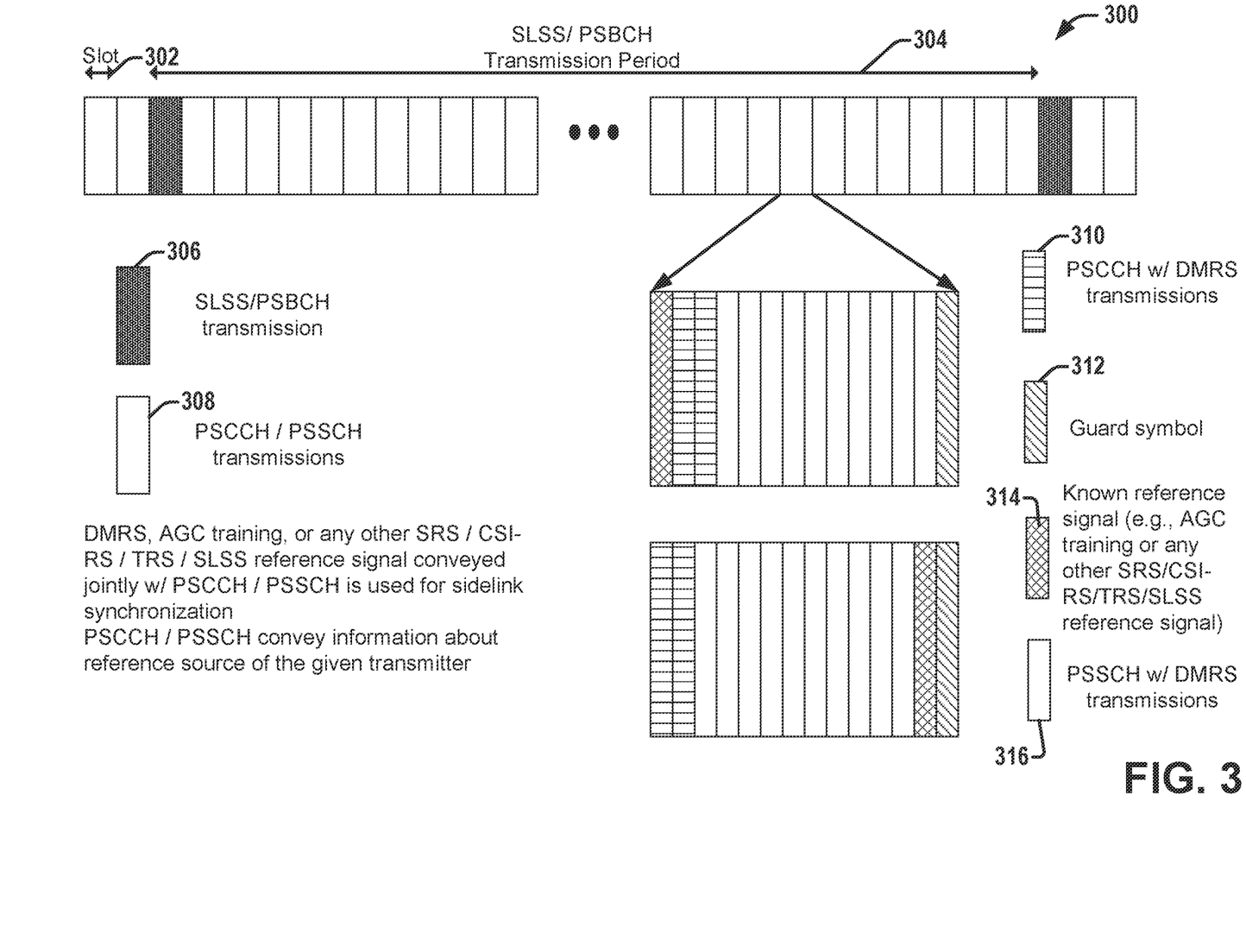
FIG. 3 is example transmission configuration of a network vehicle device for data-aided sidelink synchronization according to various aspects described herein.

Referring to FIG. 3, illustrated is an example data-aided sidelink communication configuration 300. The communication can include an SLSS/PSBCH transmission period 304 across one SLSS/PSBCH transmission of a communication burst to another SLSS/PSBCH transmission 304 within a slot 302 of another communication burst. Each transmission burst opportunity (e.g., one left and another right) can comprise a plurality of PSCCH/PSSCH transmissions within a transmission opportunity comprising of a number of slots with resource blocks. A PSCH/PSSCH transmission can carry or be associated with a demodulation reference signal DMRS, automatic gain control (AGC) training signal, or any other automatic gain control (AGC) training signal, a sidelink sounding reference signal (SRS), a sidelink channel state information reference signal (CSI-RS), a tracking reference signal (TRS), or a sidelink synchronization signal (SLSS) reference signal. One or more of these carried reference signals can be conveyed jointly with the PSCCH/PSSCH and used for sidelink synchronization by another UE, such as one that is initializing sidelink synchronization or lost a sidelink synchronization reference signal, for example.

Each of the PSCCH/PSSCH transmissions 308 can include a PSCCH with DMRS 310, a guard symbol 312, a known reference signal 314 (e.g., AGC training, or any other SRS/CSI-RS/TRS/SLSS reference signal), as well as PSSCH with DMRS 316. Each slot 302 along each transmission or NR communication burst can include different combinations of these or different locations from one another as illustrated in different examples. For example, a guard symbol 312 can be at the final symbol with either a PSCCH w DRMS 310 or a known reference signal 314 at the first symbol or before the guard symbol 312. PSSCH with DMRS transmissions 316 can be located at any symbol therein, for example.

In LTE V2X, multiple synchronization references are defined and can be used for sidelink synchronization including: GNSS, eNB, UE. There are multiple types of UE based sidelink synchronization sources that can serve as a sidelink synchronization sources with a different priority such as: 1) UEs propagating timing from network/gNB (with distinguishable first hop frequency propagation), 2) UEs propagating timing from GNSS (with a distinguishable first hop), and UEs propagating timing from independent synchronization sources or serving as independent sidelink synchronization sources (out-of-coverage case). The UEs serving as a sidelink synchronization sources periodically broadcast SLSS and PSBCH on dedicated synchronization resources. The standard specification defines priority rules for selection of sidelink synchronization sources as well as UE behaviour for SLSS/PSBCH transmission and selection of synchronization resources. The SLSS transmission period of 160ms is defined by the specification.

Although LTE-V2X sidelink synchronization procedures can be reused as a baseline for NR-V2X sidelink synchronization, the following enhancements can be considered with respect to LTE-V2X technology: initial sidelink (SL) synchronization time (latency); SL synchronization accuracy; and simplified SL synchronization complexity. Regarding initial sidelink (SL) synchronization time (latency), the enhancements can reduce initial acquisition time for sidelink synchronization aiming to reduce waiting time for sidelink communication. Regarding SL synchronization accuracy, enhancements can provide more accurate synchronization in time and frequency. Regarding simplified SL synchronization complexity a simplified complexity of sidelink synchronization procedures can be demonstrated (especially SLSS/PSBCH related part, where complicated procedures are defined in terms of synchronization (sync) source reference selection and SLSS/PSBCH transmission).

In embodiments for NR V2X sidelink synchronization, the following reference sources can be used: GNSS/gNB eNB/NR SLSS (NR UEs)/LTE SLSS (LTE UEs). The NR V2X UEs can follow various rules for synchronization reference selection that is used to determine sidelink transmission timing and frequency. As such, advantages to various embodiments can be to mitigate a long initial synchronization or resynchronization time of LTE V2X and potentially NR-V2X synchronization procedure(s).

In embodiments for SLSS based synchronization, one or more of the following UE types can serve as sidelink synchronization sources in LTE-V2X: a UE directly synchronized to eNB/gNB ($UE_{eNB}/UE_{gNB}$); a UE in-directly synchronized to eNB/gNB and propagating sync from network ($UE_{UE-eNB}/UE_{UE-gNB}$); a UE directly synchronized to GNSS ($UE_{GNSS}$); a UE in-directly synchronized to GNSS and propagating sync from GNSS ($UE_{UE-GNSS}$); an LTE UE serving as independent synchronization source ($UE_{LTE-ISS}$); and NR UE serving as independent synchronization source ($UE_{NR-ISS}$); or a UE (in)-directly synchronized to $UE_{LTE/NR-ISS}$ and propagating its timing ($UE_{UE\_LTE/NR-ISS}$).

In embodiments, a data-aided sidelink synchronization for NR-V2X sidelink communication can be performed by the UE/V2X 101 according to the data-aided sidelink communication configuration 300. For example, at least two cases can be utilized where support of data-aided synchronization can significantly increase system robustness from a synchronization perspective: in response to a loss of a sidelink synchronization reference, or in response to an initial synchronization. For loss of sidelink synchronization reference, the UE 101 has lost a GNSS/eNB/gNB or SLSS based synchronization reference. For initial synchronization, the UE 101 has lost high priority synchronization references, or those higher than ones detected as available from other UEs or network devices (e.g., 240).

If a UE 101 that has lost sidelink synchronization reference and is still receiving sidelink data transmissions (PSCCH/PSSCH) from other UEs (e.g., 240), it can be enabled or allowed to at least temporally use the timing from other UEs 240 by estimating the timing. This estimation can be performed by processing DMRS or any other reference signals conveyed jointly with PSCCH/PSSCH transmissions. In particular, any UE can derive timing from PSCCH/PSSCH transmissions by utilizing the DMRS signals to maintain or establish an accurate timing. One potential issue here is that the UE 101 (that aims to maintain sync) can derive the synchronization and inherent sync errors from the specific UEs that it has used for demodulation and therefore the synchronization errors can be biased towards this specific UE. In general, UE may try to acquire/keep sync from different UEs 222, 226 (i.e. multiple PSCCH/PSSCH transmissions) and do some averaging of the estimated synchronization parameters like timing and frequency. However, a better approach is for the UE 101 to determine a priority or ranking of reliability of detectable surrounding UEs (e.g., 222) and to utilize any of those UEs using the more reliable synchronization sources as a reference (e.g. GNSS/gNB/eNB/$UE_{GNSS}/UE_{gNB/eNB}$). As such, each sidelink user (240) can indicate the type of its original synchronization source, or a source of a sidelink synchronization reference during the PSCCH/PSSCH transmissions, so that sidelink synchronization procedure can be reused or performed based on this data. When the UE 101 is looking for synchronization, it can prioritize or maintain synchronization by processing reference signals coming jointly with PSCCH/PSSCH transmissions. The information about type of original synchronization source (e.g. GNSS/gNB/eNB/$UE_{GNSS}$/$UE_{gNB/eNB}$) or the reference used by a UE (222, or other UE) can be conveyed through sidelink control information format (SCI format) within PSCCH or added to the payload carried within PSSCH sidelink channel (e.g. Media Access Control Control Element (MAC CE) header or a Radio Resource Control (RRC) message). The information about sidelink system frame or slot number can be also conveyed through PSCCH/PSSCH in either SCI Format or MAC CE Header in order to provide full sidelink timing information. Information on a sidelink system frame or a slot number may be also implicitly encoded during PSCCH/PSSCH transmission as a part of a cyclic redundancy check (CRC), a scrambling operation, or other means. Otherwise, UE 101 could need to wait for detection of the first SLSS transmission on candidate sidelink synchronization resources, which may come with a greater delay.

Alternatively, or additionally, to transmitting PSCCH/PSSCH DMRSs for a sidelink synchronization reference to be derived therefrom, UEs can transmit some known reference signals (e.g., AGC training signals at the beginning of each sidelink transmission, or sidelink SRS, CSI-RS), then these signals can be additionally used for initial sidelink synchronization as well. The combination of DMRS/Data aided synchronization with known training reference symbol transmission can further significantly decrease the initial acquisition time for NR-V2X sidelink synchronization. These NR-V2X enhancements can be of large benefit, given that initial synchronization of LTE-V2X is one of the weak design points in terms of latency/efficiency, especially in out-of-coverage scenarios and "cold start" scenarios (without any previous sidelink synchronization reference), for example.

During an initial synchronization process (i.e. from power off state), UE 101 could be allowed to use the first synchronization it has detected for sidelink communication. For example, if during initial synchronization the UE 101 is supposed to look for GNSS/eNB/gNB/SLSS or data aided sync, then independently of which synchronization source is detected first the UE could be configured for sidelink transmission of PSCCH and PSSCH. For example, if UE 101 acquires sync from SLSS or based on data-aided sync, the UE 101 can be configured for sidelink transmissions while continuing to search for higher priority synchronization sources (e.g. GNSS/eNB/gNB/SLSS etc.).

Other enhancements that can be considered is that sidelink synchronization resources for SLSS/PSBCH transmission can be pre-configured with a sidelink synchronization source of any given type as well as central frequency within sidelink carrier bandwidth, for example.

Figure 4:
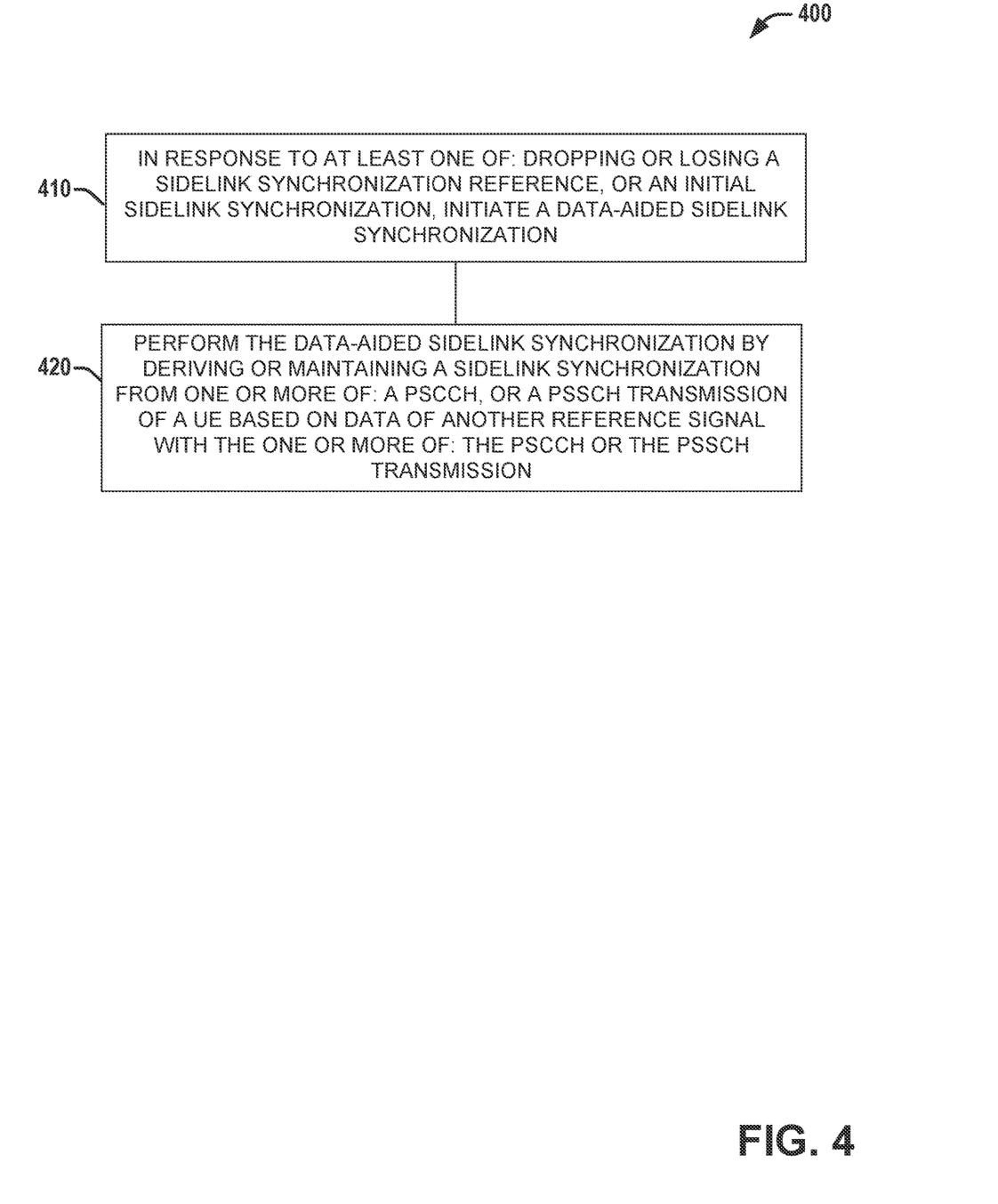
FIG. 4 a flow diagram of an example process flow employable at a network device for data-aided sidelink synchronization for V2X sidelink communications according to various aspects described herein, according to various aspects discussed herein.

Referring to FIG. 4, illustrated is a process flow 400 for NR V2X sidelink communications. At 410, the process flow 400 can initiate so that in response to at least one of: dropping or losing a sidelink synchronization reference, or an initial sidelink synchronization, the network device initiates a data-aided sidelink synchronization.

At 420, the process flow 400 includes performing the data-aided sidelink synchronization by deriving or maintaining a sidelink synchronization from one or more of: a PSCCH, or a PSSCH transmission of a UE (e.g., 222) based on data of another reference signal with the one or more of: the PSCCH or the PSSCH transmission.

A sidelink synchronization reference can based on another network device that is communicatively coupled to the network device, wherein this other network device can comprise at least one of: a Global Navigation Satellite System (GNSS) device, an eNodeB (eNB), a next generation NodeB (gNB), or a UE with the data of a sidelink synchronization signal. The other reference signal can comprise a demodulation reference signal (DMRS) signal or other reference transmission signal accompanying the PSCCH or the PSSCH transmission that includes an automatic gain control (AGC) training signal, a sidelink sounding reference signal (SRS), or a sidelink channel state information reference signal (CSI-RS).

Alternatively, or additionally, information about sidelink synchronization resources carrying a sidelink synchronization signal (SLSS)/physical sidelink broadcast channel (PSBCH) transmission can be pre-configured to the network device comprising a UE. Information related to sidelink synchronization resources that carry SLSS/PSBCH can be (pre)-configured to UE and can include at least one of: a subcarrier spacing (SCS) for a SLSS and a physical sidelink broadcast channel (PSBCH) transmission, a cyclic prefix (CP) length, a bandwidth (BW) location, a center frequency for the SLSS/the PSBCH transmission, a type of original or reference synchronization source, a period of the SLSS/the PSBCH transmission, or an offset with respect to a sidelink system frame number or a slot number.

In other aspects/embodiments, in response to receiving a source of a sidelink communication from a plurality of network devices, a determination can be performed for which network device sidelink communication is more reliable, and use the data from the network device sidelink communication for maintaining or deriving the sidelink synchronization. The data can be a ranking, where the highest ranked network device in terms of reliability could be selected, while searching continues concurrently or on-goingly.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a network component of a network device for next generation or new radio (NR) sidelink synchronization in a Fifth Generation Core Network (5GC), comprising: a memory interface; and processing circuitry configured to: in response to at least one of: dropping/losing a sidelink synchronization reference, performing an initial sidelink synchronization, or monitoring a sidelink synchronization initiating a data-aided sidelink synchronization; and performing the data-aided sidelink synchronization by deriving or maintaining the sidelink synchronization from one or more of: a physical sidelink control channel (PSCCH), or a physical sidelink shared channel (PSSCH) transmission based on a demodulation reference signal (DMRS) or data with the one or more of: the PSCCH or the PSSCH transmission.

A second example can include the first example, wherein the sidelink synchronization reference is based on another network device that is communicatively coupled to the network device, wherein the another network device comprises at least one of: a Global Navigation Satellite System (GNSS) device, an eNodeB (eNB), a next generation NodeB (gNB), or a user equipment (UE) providing the sidelink synchronization reference through transmission of synchronization signals.

A third example can include the first or second example, wherein another reference signal comprises the DMRS or another reference transmission signal accompanying the PSCCH or the PSSCH transmission that includes an automatic gain control (AGC) training signal, a sidelink sounding reference signal (SRS), or a sidelink channel state information reference signal (CSI-RS).

A fourth example can include any one of the first through third examples, wherein information about sidelink synchronization source priority and resources carrying a sidelink synchronization signal (SLSS)/physical sidelink broadcast channel (PSBCH) transmission is pre-configured to the network device comprising a UE.

A fifth example can include any one of the first through fourth examples, wherein the processing circuitry is further configured to: in response to receiving sources of sidelink synchronization references from a plurality of UE devices, determine which sidelink synchronization reference of a UE device is more reliable, and use related data and the sidelink synchronization reference for maintaining or deriving the sidelink synchronization.

A sixth example can include any one of the first through fifth examples, wherein the processing circuitry is further configured to: receive or provide a type/source of the sidelink synchronization reference or an original sidelink synchronization reference being used for a sidelink communication to enable a derivation of the sidelink synchronization from the PSCCH or the PSSCH transmission in response to the sidelink synchronization reference being lost.

A seventh example can include any one of the first through sixth examples, wherein the processing circuitry is further configured to: receive or provide information about the type/source of the sidelink synchronization reference or the original sidelink synchronization source via one or more of: the PSCCH or the PSSCH as a separate field of a sidelink control information (SCI) format, a Media Access Control (MAC) signaling, a radio resource control (RRC) signaling, an implicitly encoding into a cyclic redundancy check (CRC), a scrambling or reference signal structure, to enable a selection of another network device to be used for the sidelink synchronization.

An eighth example can include any one of the first through seventh examples, wherein information related to sidelink synchronization source priority and resources that carry subcarrier spacing (SCS)/physical sidelink broadcast channel (PSBCH) is (pre)-configured to UE, and comprises at least one of: a subcarrier spacing (SCS) for the SLSS/PSBCH, a cyclic prefix (CP) length, a bandwidth (BW) location, a center frequency for the SLSS/the PSBCH, a type of original or reference synchronization source, a period of the SLSS/the PSBCH, or an offset with respect to a sidelink system frame number or a slot number.

A ninth example can be a computer readable storage medium storing executable instructions that, in response to execution of operations, cause one or more processors of a user equipment (UE) to support a sidelink communication, the operations comprising: receiving data of another sidelink reference signal in one or more of: a physical sidelink control channel (PSCCH), or a physical sidelink shared channel (PSSCH); and performing a data-aided sidelink synchronization based on the data of the another sidelink reference signal in response to losing a sidelink synchronization reference or an initial sidelink synchronization.

A tenth example can include the ninth example, wherein the operations further comprise: receiving or providing information about a sidelink system frame or a slot number via the PSCCH or the PSSCH in a sidelink control information (SCI) format, a Media Access Control (MAC) control element (CE) header, or a radio resource control (RRC) signal that comprises sidelink timing information.

An eleventh example can include any one of the ninth through tenth examples, wherein the operations further comprise: performing the data-aided sidelink synchronization in response to an initial sidelink synchronization comprising: receiving at least one of: an automatic gain control (AGC) or a synchronization signal; extracting synchronization parameters based on the AGC or the synchronization signal; and establishing the sidelink communication based on the synchronization parameters.

A twelfth example can include any one of the ninth through eleventh examples, wherein the operations further comprise: transmitting or receiving the synchronization parameters at a beginning of a slot transmission.

A thirteenth example can include any one of the ninth through twelfth examples, wherein the operations further comprise: performing the data-aided sidelink synchronization in response to an initial sidelink synchronization comprising: selecting a first detected synchronization reference to initiate the sidelink communication while continuing to search for one or more higher priority synchronization references and seamless reselection of the one or more higher priority synchronization references in response to the one or more higher priority synchronization references being detected.

A fourteenth example can include any one of the ninth through thirteenth examples, wherein the operations further comprise: propagating the synchronization reference signal from a Global Navigation Satellite System (GNSS) based UE, a UE directly synchronized to eNB/gNB ($UE_{eNB}$/$UE_{gNB}$), a UE in-directly synchronized to eNB/gNB and propagating sync from network ($UE_{UE-eNB}$/$UE_{UE-gNB}$), a UE directly synchronized to GNSS ($UE_{GNSS}$), a UE in-directly synchronized to GNSS and propagating sync from GNSS ($UE_{UE-GNSS}$), an LTE based UE serving as independent synchronization source ($UE_{LTE-ISS}$), an NR UE serving as an independent synchronization source (UE$_{NR\text{-}ISS}$), or a UE (in)-directly synchronized to UE$_{LTE/NR\text{-}ISS}$ and propagating a timing related thereto.

A fifteenth example can be an apparatus configured to be employed in a network device for new radio (NR) sidelink synchronization communication, comprising: a memory interface; and processing circuitry configured to: enable a data-aided sidelink synchronization by providing data of a sidelink synchronization source with at least one of: a physical sidelink control channel (PSCCH), or a physical sidelink shared channel (PSSCH); and provide a transmission of the at least one of: the PSCCH, the PSSCH, or the other physical sidelink channel and a sidelink synchronization reference signal based on the data of the sidelink synchronization source during the transmission for establishing a sidelink communication.

A sixteenth example can include the fifteenth example, wherein the sidelink synchronization reference signal comprises a Global Navigation Satellite System (GNSS), eNB/gNB, SLSS/PSBCH from UE directly and indirectly synchronized to GNSS or network and independent sidelink synchronization source (ISS).

A seventeenth example can include any one of the fifteenth through the sixteenth examples, wherein the processing circuitry is further configured to provide a broadcast of a sidelink synchronization signal (SLSS)/physical sidelink broadcast channel (PSBCH) transmission with the data of the sidelink synchronization source or a sidelink synchronization resource.

An eighteenth example can include any one of the fifteenth through the seventeenth examples, wherein the processing circuitry is further configured to extract sidelink synchronization information for the sidelink communication from information received that is related to the sidelink synchronization reference signal to establish a sidelink connection with a V2X device.

A nineteenth example can include any one of the fifteenth through the eighteenth examples, wherein the processing circuitry is further configured to extract the sidelink synchronization information based on an automatic gain control (AGC) or a synchronization signal at a beginning of a slot transmission, wherein the information comprises at least one of: a subcarrier spacing (SCS) for a SLSS/a physical sidelink broadcast channel (PSBCH) transmission, a cyclic prefix (CP) length, a bandwidth (BW) location, a center frequency for the SLSS/the PSBCH transmission, a type of original or reference synchronization source, a period of the SLSS/the PSBCH transmission, or an offset with respect to a sidelink system frame number or a slot number.

A twentieth example can include any one of the fifteenth through the nineteenth examples, wherein the processing circuitry is further configured to search for a higher priority synchronization reference to initiate the sidelink communication based on the data-aided sidelink synchronization in response to at least one of: dropping or losing the sidelink synchronization reference signal, or an initial sidelink synchronization.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a network device for sidelink synchronization in a wireless communication network, comprising:
    a memory interface; and
    processing circuitry coupled to the memory interface and configured to:
        in response to an absence of a sidelink synchronization reference, initiating a data-aided sidelink synchronization; and
        deriving the sidelink synchronization based on a sidelink channel state information reference signal (CSI-RS) accompanying one or more of a physical sidelink control channel (PSCCH) or a physical sidelink shared channel (PSSCH) transmission, wherein the sidelink CSI-RS occupies an initial symbol of each of a plurality of slots during the PSCCH or the PSSCH transmission.

2. The apparatus of claim 1, wherein the sidelink synchronization reference is based on another network device that is communicatively coupled to the network device, wherein the other network device comprises at least one of: a Global Navigation Satellite System (GNSS) device, a base station, or a user equipment (UE) providing the sidelink synchronization reference through transmission of synchronization signals.

3. The apparatus of claim 1, wherein information about sidelink synchronization source priority and resources carrying a sidelink synchronization signal (SLSS)/physical sidelink broadcast channel (PSBCH) transmission is pre-configured to the network device.

4. The apparatus of claim 1, wherein the processing circuitry is further configured to:
    in response to receiving sources of sidelink synchronization references from a plurality of user equipment (UE) devices, determine which sidelink synchronization reference of a UE device of the plurality of UE devices is more reliable, and use related data and the sidelink synchronization reference for deriving the sidelink synchronization.

5. The apparatus of claim 1, wherein the processing circuitry is further configured to:
receive or provide a type/source of the sidelink synchronization reference or an original sidelink synchronization reference being used for a sidelink communication to enable a derivation of the sidelink synchronization from the PSCCH or the PSSCH transmission in response to the sidelink synchronization reference being absent.

6. The apparatus of claim 5, wherein the processing circuitry is further configured to:
receive or provide information about the type/source of the sidelink synchronization reference or the original sidelink synchronization reference via one or more of: the PSCCH or the PSSCH as a separate field of a sidelink control information (SCI) format, a Media Access Control (MAC) signaling, a radio resource control (RRC) signaling, an implicit encoding into a cyclic redundancy check (CRC), a scrambling or reference signal structure, to enable a selection of another network device to be used for the sidelink synchronization.

7. The apparatus of claim 5, wherein information related to sidelink synchronization source priority and resources that carry sidelink synchronization signal (SLSS)/ physical sidelink broadcast channel (PSBCH) is (pre)-configured to the network device, and comprises at least one of: a subcarrier spacing (SCS) for the SLSS/PSBCH, a cyclic prefix (CP) length, a bandwidth (BW) location, a center frequency for the SLSS/PSBCH, a type of original or reference synchronization source, a period of the SLSS/PSBCH, or an offset with respect to a sidelink system frame number or a slot number.

8. A non-transitory computer readable storage medium storing executable instructions that, when executed by one or more processors of a user equipment (UE), cause the UE to support a sidelink communication by performing operations comprising:
receiving a sidelink channel state information reference signal (CSI-RS) with one or more of a physical sidelink control channel (PSCCH) or a physical sidelink shared channel (PSSCH), wherein the sidelink CSI-RS occupies a single symbol of each of a plurality of slots during the PSCCH or the PSSCH; and
performing a data-aided sidelink synchronization based on the sidelink CSI-RS in response to an absence of a sidelink synchronization reference.

9. The non-transitory computer readable storage medium of claim 8, wherein the operations further comprise:
receiving or providing information about a sidelink system frame or a slot number via the PSCCH or the PSSCH in a sidelink control information (SCI) format, a Media Access Control (MAC) control element (CE) header, or a radio resource control (RRC) signal that comprises sidelink timing information.

10. The non-transitory computer readable storage medium of claim 8, wherein the operations further comprise:
performing the data-aided sidelink synchronization in response to an initial sidelink synchronization, wherein performing the data-aided sidelink synchronization comprises:
receiving at least one of an automatic gain control (AGC) or a synchronization signal;
extracting synchronization parameters based on the AGC or the synchronization signal; and
establishing the sidelink communication based on the synchronization parameters.

11. The non-transitory computer readable storage medium of claim 10, wherein the operations further comprise:
transmitting or receiving the synchronization parameters at a beginning of a slot transmission.

12. The non-transitory computer readable storage medium of claim 8, wherein the operations further comprise:
performing the data-aided sidelink synchronization in response to an initial sidelink synchronization, wherein performing the data-aided sidelink synchronization comprises:
selecting a first detected synchronization reference to initiate the sidelink communication while continuing to search for one or more higher priority synchronization references; and
reselecting the one or more higher priority synchronization references in response to the one or more higher priority synchronization references being detected.

13. The non-transitory computer readable storage medium of claim 8, wherein the operations further comprise:
propagating the sidelink synchronization reference from a Global Navigation Satellite System (GNSS) based UE, a UE directly synchronized to eNB/gNB ($UE_{eNB}$/$UE_{gNB}$), a UE in-directly synchronized to eNB/gNB and propagating sync from network ($UE_{UE\text{-}eNB}$/$UE_{UE\text{-}gNB}$), a UE directly synchronized to GNSS ($UE_{GNSS}$), a UE in-directly synchronized to GNSS and propagating sync from GNSS ($UE_{UE\text{-}GNSS}$), an LTE based UE serving as an independent synchronization source ($UE_{LTE\text{-}ISS}$), an NR UE serving as an independent synchronization source ($UE_{NR\text{-}ISS}$), or a UE (in)-directly synchronized to $UE_{LTE/NR\text{-}ISS}$ and propagating a timing related thereto.

14. An apparatus configured to be employed in a network device for sidelink synchronization communication, comprising:
a memory interface; and
processing circuitry coupled to the memory interface and configured to:
enable a data-aided sidelink synchronization based on a sidelink synchronization source with at least one of a physical sidelink control channel (PSCCH) or a physical sidelink shared channel (PSSCH); and
encode for transmission the at least one of the PSCCH, the PSSCH, or another physical sidelink channel and a sidelink channel state information reference signal (CSI-RS) based on the sidelink synchronization source for establishing a sidelink communication, wherein the at least one of the PSCCH, the PSSCH, or the other physical sidelink channel is encoded such that the sidelink CSI-RS occupies a single symbol or an initial symbol of each of a plurality of slots during the PSCCH or the PSSCH.

15. The apparatus of claim 14, wherein the sidelink synchronization source comprises a Global Navigation Satellite System (GNSS), a base station, a UE directly or indirectly synchronized to a GNSS or a base station, or an independent sidelink synchronization source (ISS).

16. The apparatus of claim 14, wherein the processing circuitry is further configured to encode for broadcast of a sidelink synchronization signal (SLSS)/physical sidelink broadcast channel (PSBCH) transmission based on the sidelink synchronization source.

17. The apparatus of claim 14, wherein the processing circuitry is further configured to encode for transmission sidelink synchronization information for the sidelink communication based on information that is related to the sidelink CSI-RS to establish a sidelink connection with a V2X device.

18. The apparatus of claim 17, wherein the processing circuitry is further configured to encode for transmission the sidelink synchronization information based on an automatic gain control (AGC) or a synchronization signal at a beginning of a slot transmission, wherein the sidelink synchronization information comprises at least one of: a subcarrier spacing (SCS) for a sidelink synchronization signal (SLSS)/physical sidelink broadcast channel (PSBCH) transmission, a cyclic prefix (CP) length, a bandwidth (BW) location, a center frequency for the SLSS/PSBCH transmission, a type of original or reference synchronization source, a period of the SLSS/PSBCH transmission, or an offset with respect to a sidelink system frame number or a slot number.

* * * * *